US012397698B2

(12) United States Patent
McGraw et al.

(10) Patent No.: US 12,397,698 B2
(45) Date of Patent: Aug. 26, 2025

(54) CAB AND CARGO BODY CONFIGURATION FOR A DELIVERY VEHICLE

(71) Applicant: Oshkosh Corporation, Oshkosh, WI (US)

(72) Inventors: David C. McGraw, Oshkosh, WI (US); Andrew Drach, Oshkosh, WI (US); James Benner, Oshkosh, WI (US); Paul Schmidt, Oshkosh, WI (US); Annette Rantanen, Oshkosh, WI (US); Robby Lamers, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 373 days.

(21) Appl. No.: 17/577,097

(22) Filed: Jan. 17, 2022

(65) Prior Publication Data
US 2022/0134934 A1 May 5, 2022

Related U.S. Application Data

(63) Continuation of application No. 16/426,656, filed on May 30, 2019, now Pat. No. 11,225,185.

(60) Provisional application No. 62/678,735, filed on May 31, 2018.

(51) Int. Cl.
B60P 3/00 (2006.01)
B60J 5/02 (2006.01)
B60J 5/06 (2006.01)
B62D 33/04 (2006.01)

(52) U.S. Cl.
CPC ............... B60P 3/007 (2013.01); B60J 5/02 (2013.01); B60J 5/062 (2013.01); B62D 33/04 (2013.01)

(58) Field of Classification Search
CPC ... B60P 3/007; B60J 5/02; B60J 5/062; B62D 33/04; A47B 43/00; A47B 43/003; A47B 46/00; A47B 46/005; A47B 47/00; A47B 47/021; A47B 47/022; A47B 47/024; A47B 57/00; A47B 47/045; A47B 96/00;
(Continued)

(56) References Cited

U.S. PATENT DOCUMENTS 3,667,635 A * 6/1972 Hackney ............... B60J 5/08
296/35.3
5,538,274 A 7/1996 Schmitz et al.
5,697,741 A 12/1997 Harris et al.
(Continued)

FOREIGN PATENT DOCUMENTS

| DE | 102005050260 A1 * | 4/2007 | ............ B60R 9/055 |
| EP | 3636517 A1 * | 4/2020 | ............... B60P 3/32 |
| FR | 3047952 A1 * | 8/2017 | ........... B60R 21/026 |

OTHER PUBLICATIONS

EP-3636517-A1 computer translation (Year: 2020).*
(Continued)

Primary Examiner — Dennis H Pedder
(74) Attorney, Agent, or Firm — Foley & Lardner LLP

(57) ABSTRACT

A vehicle includes a chassis and a vehicle body coupled to the chassis. The vehicle body includes a cab disposed on a forward end of the chassis and a cargo body disposed on a rear end of the chassis. The cab includes a front door that is slidably engaged to the cab. The cargo body includes a side door that is slidably engaged to the cargo body. The front door and the side door are disposed on the same side of the vehicle.

11 Claims, 15 Drawing Sheets

(58) Field of Classification Search
CPC ......... B60R 5/00; B60R 5/003; B60R 21/026; B60R 21/12
USPC ........ 296/24.4, 182, 1, 180, 190.01, 190.03, 296/190.08, 190.11, 186.4, 55, 37.6
See application file for complete search history.

(56) References Cited

U.S. PATENT DOCUMENTS

| | | | |
|---|---|---|---|
| 5,779,300 | A | 7/1998 | McNeilus et al. |
| 5,829,946 | A | 11/1998 | McNeilus et al. |
| 5,931,628 | A | 8/1999 | Christenson |
| 6,290,450 | B1 | 9/2001 | Humphries et al. |
| 6,328,374 | B1 * | 12/2001 | Patel ............... B60J 5/06 49/213 |
| 6,485,079 | B1 | 11/2002 | Brown et al. |
| 6,489,945 | B1 * | 12/2002 | Gordon ............... G06F 3/0325 348/340 |
| 6,527,495 | B2 | 3/2003 | Humphries et al. |
| 6,666,491 | B2 | 12/2003 | Schrafel |
| 6,793,268 | B1 | 9/2004 | Faubert et al. |
| 6,918,721 | B2 | 7/2005 | Venton-Walters et al. |
| 6,997,506 | B2 | 2/2006 | Hecker |
| 7,055,880 | B2 | 6/2006 | Archer |
| 7,073,847 | B2 | 7/2006 | Morrow et al. |
| 7,118,314 | B2 | 10/2006 | Zhou et al. |
| 7,264,305 | B2 | 9/2007 | Kuriakose |
| 7,370,904 | B2 | 5/2008 | Wood et al. |
| 7,517,005 | B2 | 4/2009 | Kuriakose |
| 7,621,580 | B2 | 11/2009 | Randjelovic et al. |
| 7,726,723 | B2 * | 6/2010 | Takahashi ............... B60J 5/06 296/155 |
| 7,823,948 | B2 | 11/2010 | Redman et al. |
| 7,954,882 | B2 | 6/2011 | Brummel et al. |
| 8,152,216 | B2 | 4/2012 | Howell et al. |
| 8,376,439 | B2 | 2/2013 | Kuriakose et al. |
| 8,794,886 | B1 | 8/2014 | Nett et al. |
| 8,967,699 | B1 | 3/2015 | Richmond et al. |
| 9,016,703 | B2 | 4/2015 | Rowe et al. |
| 9,045,014 | B1 | 6/2015 | Verhoff et al. |
| 9,174,686 | B1 | 11/2015 | Messina et al. |
| 9,366,507 | B1 | 6/2016 | Richmond et al. |
| 9,493,093 | B2 | 11/2016 | Stingle et al. |
| 9,604,564 | B1 * | 3/2017 | Pellicer ............... B60P 3/39 |
| 9,656,640 | B1 | 5/2017 | Verhoff et al. |
| 9,707,869 | B1 | 7/2017 | Messina et al. |
| 9,738,186 | B2 | 8/2017 | Krueger et al. |
| 9,764,613 | B2 | 9/2017 | Rowe et al. |
| 9,770,102 | B2 * | 9/2017 | Conod ............... A47B 47/0083 |
| 9,802,655 | B2 | 10/2017 | Sharbono et al. |
| 2017/0217348 | A1 * | 8/2017 | Paunov ............... A47B 43/00 |

OTHER PUBLICATIONS

DE102005050260 Text (Year: 2007).*
FR3047952 Text (Year: 2017).*
Mariage, Duane, "Replace the rear cargo door roller track on an LLV postal truck," WonderHowTo.com, Sep. 12, 2010, retrieved from internet on Aug. 25, 2021, URL: https://diy-auto-repair.wonderhowto.com/how-to/replace-rear-cargo-door-roller-track-llv-postal-truck-396549/, 5 pages.
The Public Group, LLC, "Auction #1424328—1991 Chevy/Grumman 2WD Mail Truck," Public Surplus, Aug. 5, 2015, retrieved from the internet on Aug. 25, 2021, URL: https://www.publicsurplus.com/sms/auction/view?auc=1424328, 2 pages.
Youtube, screen captures from YouTube video clip entitled "LLVlog #1: I Just Bought A Mail Truck," uploaded on Apr. 20, 2021 by user "Postal Dog", URL: https://www.youtube.com/watch?v=y0LpZYUReQc, 6 pages.
Youtube, screen captures from YouTube video clip entitled "LLVlog #2: Day 1 Inspections, Maintenance," uploaded on Apr. 27, 2021 by user "Postal Dog", URL: https://www.youtube.com/watch?v=PJmaiwrrbxQ, 7 pages.
Youtube, screen captures from YouTube video clip entitled "Vehicle Tour: Post Office Delivery Truck," uploaded on Mar. 5, 2017 by user "GK7 DIY", URL: https://www.youtube.com/watch?v=9QfDdo4Wnql&t, 6 pages.

* cited by examiner

CAB AND CARGO BODY CONFIGURATION FOR A DELIVERY VEHICLE

CROSS-REFERENCE TO RELATED PATENT APPLICATIONS

The present application is a continuation of U.S. patent application Ser. No. 16/426,656, filed May 30, 2019, which claims the benefit of and priority to U.S. Provisional Patent Application No. 62/678,735, filed May 31, 2018, the contents of which are hereby incorporated by reference in their entireties.

BACKGROUND

Mail and package delivery vehicles transport a variety of cargo from post-office and shipping centers to residences and businesses. These delivery vehicles are configured to carry large quantities of material to reduce the number of trips between the post-office and various municipalities. The delivery vehicles are also configured so that the packages may be quickly loaded at the post-office or shipping center and are readily accessible to an operator during delivery. During a typical route, an operator may need to access mail boxes from within the vehicle to drop off smaller mail items, enter and exit the vehicle repeatedly to drop off larger packages, and access the cargo area to quickly locate packages for drop-off.

SUMMARY

An embodiment relates to a vehicle. The vehicle includes a chassis and a vehicle body coupled to the chassis. The vehicle body includes a cab disposed on a forward end of the chassis and a cargo body disposed on a rear end of the chassis. The cab includes a front door that is slidably engaged to the cab. The cargo body includes a side door that is slidably engaged to the cargo body. The front door and the side door are disposed on the same side of the vehicle.

In any of the above embodiments, a height of the cargo body may be greater than a height of the cab. In these instances, the vehicle may further include a roof cab assembly disposed proximate to an upper surface of the cab. The roof cap assembly may extend between an A-pillar and a B-pillar of the cab. An upper edge of the roof cap assembly may be approximately flush with an upper wall of the cargo body. Additionally, the roof cap assembly may be coupled to at least one of the upper surface or a forward surface of the cargo body. In some embodiments, the cab may include a cutout disposed in a top wall of the cab and the roof cap assembly may completely cover the cutout.

Another embodiment relates to a vehicle. The vehicle includes a chassis and a vehicle body coupled to the chassis. The vehicle body includes a cab disposed on a forward end of the chassis and a cargo body disposed on a rear end of the chassis. The cab includes a front door that is slidably engaged to the cab. The cargo body includes a plurality of side walls, an upper wall, a forward partition, and a lower wall that together define a storage volume. The cargo body additionally includes a side door, an access door, and a rear door. The side door is slidably engaged to one of the plurality of side walls. The access door is slidably engaged to the forward partition. The rear door is slidably engaged to a rear facing one of the plurality of side walls. Each of the side door, the access door, and the rear door separate the storage volume from an environment surrounding the vehicle.

In some embodiments, the front door and the side door are disposed on the same side of the vehicle. In some implementations, a height of the cargo body is greater than a height of the cab. In these instances, the vehicle may further include a roof cap assembly extending between an A-pillar and a B-pillar of the cab. An upper edge of the roof cap assembly may be approximately flush with the upper wall. Additionally, the roof cap assembly may be coupled to at least one of the upper surface of the cab or the forward partition.

Another embodiment relates to a cargo body. The cargo body includes a plurality of side walls, an upper wall, a forward partition, and a lower wall that together define a storage volume. The cargo body additionally includes a side door, an access door, and a rear door. The side door may be slidably engaged to one of the plurality of side walls. The access door may be slidably engaged to the forward partition. The rear door may be slidably engaged to a rear facing one of the plurality of side walls. Each of the side door, the access door, and the rear door separate the storage volume from an environment surrounding the vehicle.

In some embodiments, the forward partition includes an access that is sized to accommodate a standing height of an occupant and the access door is disposed in the access. In some embodiments, the cargo body further includes a roof cap assembly. In these instances, an upper edge of the roof cap assembly may be approximately flush with the upper wall. Additionally, the roof cap assembly may be coupled to the forward partition.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 2:
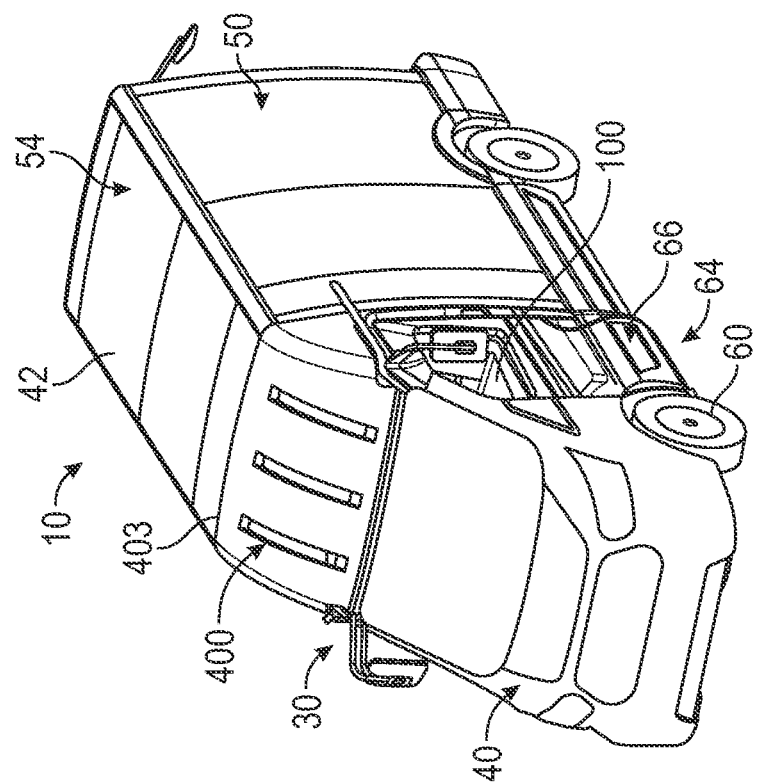
FIGS. 1-2 are perspective views of a mail and package delivery vehicle, according to an illustrative embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

As shown in FIGS. 1-6, a mail and delivery vehicle includes a frame and a vehicle body mounted to the frame. The vehicle body further includes a cab toward the front of the delivery vehicle that is used to accommodate one or more vehicle operators. In an embodiment, the cab is a third-party designed vehicle cab (e.g., for a commercial utility vehicle, truck, etc.). The cab includes a sliding door that provides access to and from an interior volume of the cab, while minimizing the overall footprint of the delivery vehicle.

In various embodiments, the cab of the delivery vehicle includes an opening along its upper wall that allows an occupant to stand at least partially erect (e.g., in a standing position) in the cab (e.g., that permits a user to raise his/her head above the upper wall of the cab). To protect the occupant and cab from exposure to the surrounding environment, the delivery vehicle includes a roof cap assembly that that couples the upper surface of the cab to a forward wall of the cargo body. An occupant is provided with three different access points to the cargo body. A first access point is an access door disposed in a partition between the cab and the cargo body. This access door is coupled to a track assembly in the partition and can be quickly opened by an occupant by sliding the access door along the partition wall. A second access point is a side access door disposed in a side wall of the cargo body. The side access door is similar to the sliding door on the cab and is located on the same side of the vehicle (e.g., passenger or driver side) as the sliding door. The side access door also includes a track assembly, which is configured to facilitate delivery operations while maximizing available storage volume at the interior of the cargo body. Finally, a third access point is a retractable (e.g., coiling door, rolling sheet, etc.) rear access door that provides larger clearance for oversized packages and delivery truck loading operations.

The interior space of the cargo body is outfitted with multiple shelves that are uniquely configured to maximize the utility of the storage space. The shelves are disposed between adjacent frame rails of the cargo body and are connected to the frame rails. Advantageously, each shelf may be configured in either a folded position, where the shelves are retracted into the space between frame rails, or an extended position in which the shelf is turned downward to accommodate mailings and other packages. The arrangement of shelves may be modified to more efficiently utilize the interior space of the cargo body. The details of the general depiction provided in FIGS. 1-6 will be more fully explained by reference to FIGS. 7-25.

Figure 3:
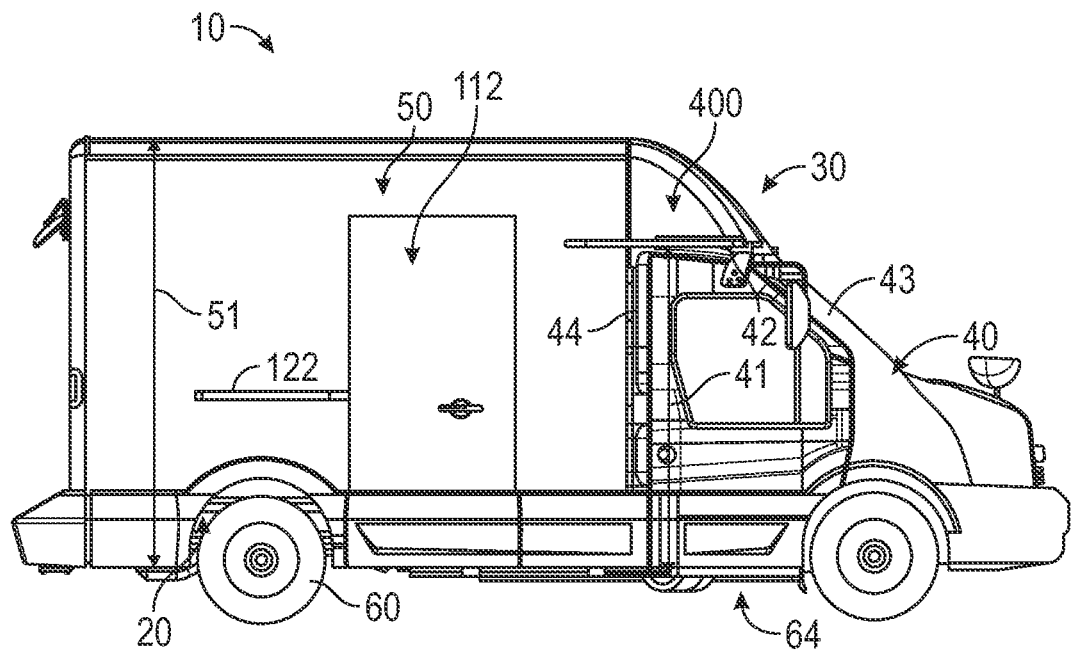
FIG. 3 is a right side view of the mail and package delivery vehicle of FIGS. 1-2.

According to the exemplary embodiment of FIGS. 1-6, a vehicle, shown as delivery vehicle 10 includes a chassis, shown as frame 20, and a vehicle body, shown as body 30 that is rigidly coupled to the frame 20. The body 30 of the delivery vehicle 10 includes a cab 40 coupled to a front end of the frame 20 and cargo body, shown as cargo box 50, coupled to a rear end of the frame 20. As shown in FIG. 3, a height 51 of the cargo box 50 (e.g., up and down as shown in FIG. 3), from an upper edge of the cargo box 50 to a lower edge of the cargo box 50 is greater than a maximum height 41 of the cab 40. The cab 40 is configured to accommodate one or more occupants of the delivery vehicle 10. In the delivery vehicle 10 of FIGS. 1-6, the cab 40 is an enclosure that protects an occupant from environmental and road hazards. The cab 40 may include various components to facilitate operation of the delivery vehicle 10 by an operator. For example, the cab 40 may include an instrument panel that provides a user with diagnostic information about the delivery vehicle 10. The cab may also include control equipment (e.g., steering wheel, throttle and brake pedals, signals, etc.) associated with the delivery vehicle 10, which are contained within an interior space of the cab 40 for ready access by an operator. The delivery vehicle 10 also includes a prime mover, or engine, coupled to the frame 20 (e.g., at a position beneath the cab 40). The engine is configured to provide power to a plurality of tractive elements, shown as wheels 60, and/or other systems of the delivery vehicle 10 (e.g., a pneumatic system, a hydraulic system, etc.). The engine may be configured to utilize one or more of a variety of fuels (e.g., gasoline, diesel, bio-diesel, ethanol, natural gas, etc.), according to various embodiments. The engine may additionally or alternatively include one or more electric motors coupled to the frame 20 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the delivery vehicle 10.

Figure 1:
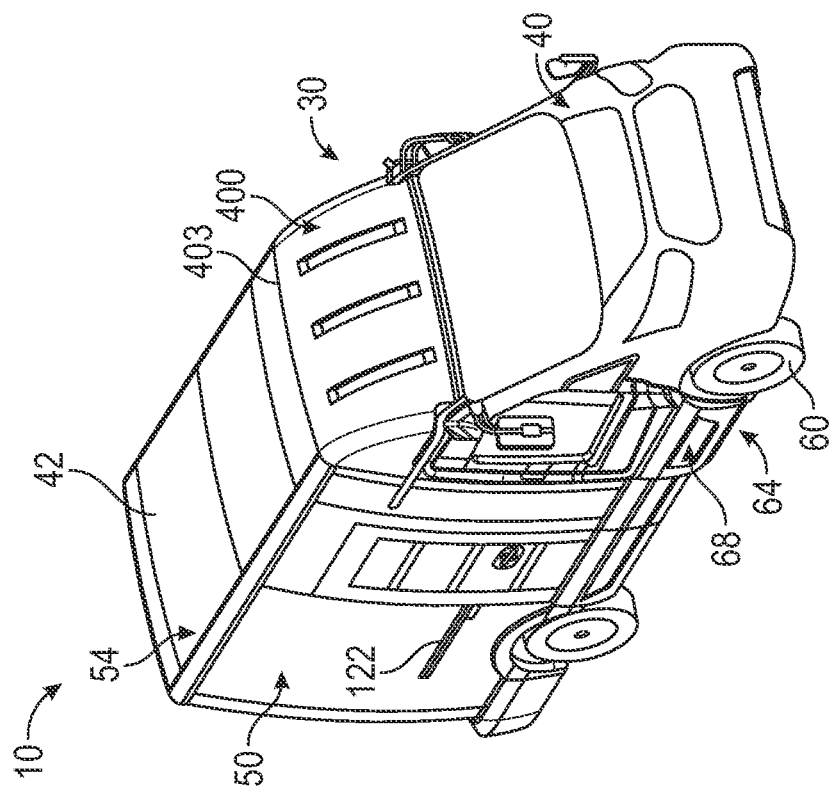

In various embodiments, the cab 40 of the delivery vehicle 10 includes a sliding door system, shown as sliding front door system 64 that facilitates user entry and exit from the delivery vehicle 10. The sliding front door system 64 includes at least one front sliding door. As shown in FIGS. 1-2, the front sliding door may be one of a left sliding door 66 slidably engaged to a left side (e.g., driver's side) of the cab 40 of the delivery vehicle 10, or a right sliding door 68 slidably engaged to a right side (e.g., passenger's side) of the cab 40 of the delivery vehicle 10. Each of the left sliding door 66 and the right sliding door 68 are structured to move (e.g., slide) relative to the delivery vehicle 10 in substantially parallel orientation with a side (e.g., a lateral side, a passenger or driver side) of the delivery vehicle 10. As shown in FIGS. 1-2, the sliding front door system 64 includes both a left sliding door 66 and a right sliding door

68. The sliding front door system 64 further includes a plurality of track assemblies that are coupled (e.g., mounted) to at least one of the frame 20 and the cab 40. In the illustrative embodiment of FIGS. 1-2, the arrangement of track assemblies is similar for each of the left sliding door 66 and the right sliding door 68. Among other benefits, incorporating sliding doors on the cab 40 improves accessibility into and out of the cab 40 as compared with hinged-type doors, particularly in tight spaces where available clearance in a lateral direction (into and out of the page of FIGS. 3-4) away from the cab 40 is small.

Figure 7:
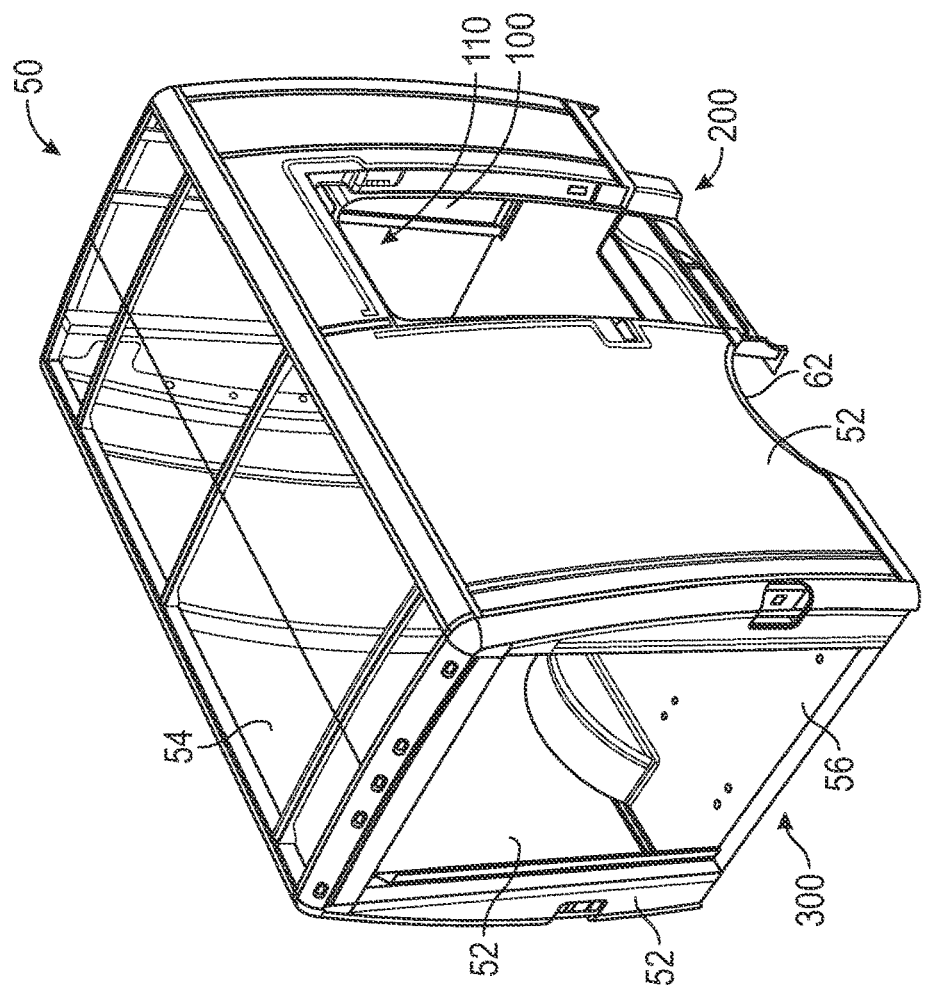
FIG. 7 is a perspective view of a cargo box for the mail and package delivery vehicle of FIGS. 1-2.
Figure 6:
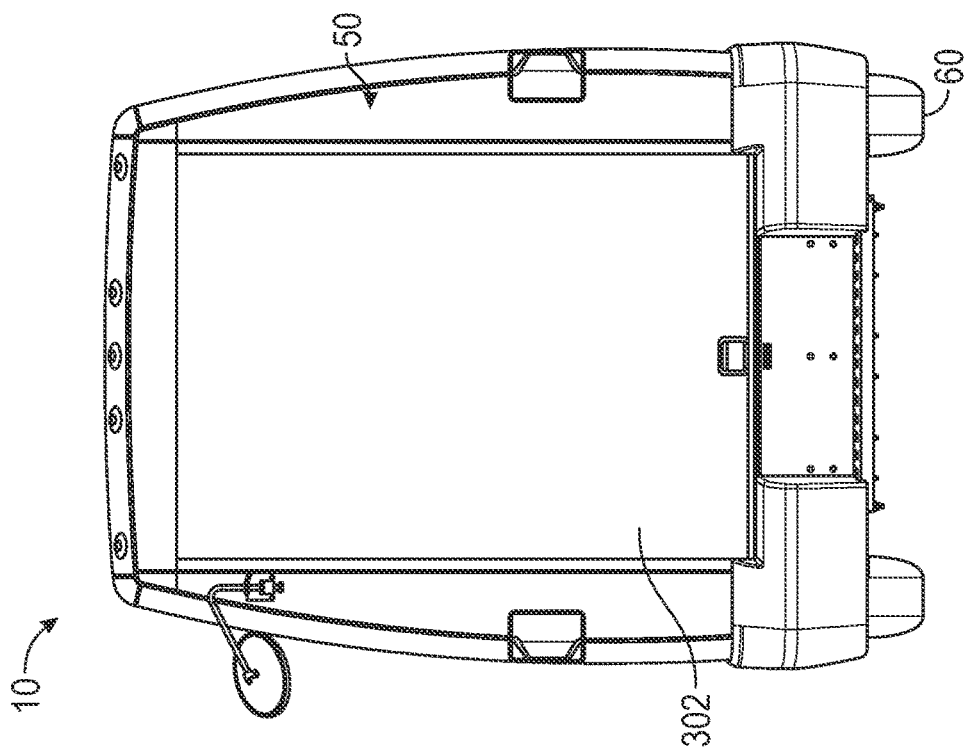
FIG. 6 is a rear view of the mail and package delivery vehicle of FIGS. 1-2.

As shown in FIG. 7, the cargo box 50 is a separate structure from the cab 40 (see also FIGS. 1-2) and is coupled to the cab 40. In other embodiments, the cab 40 and the cargo box 50 may be a single unitary structure. The cargo box 50 includes a plurality of side walls 52, an upper wall 54, a lower wall 56, and a forward partition 100 that together define a storage volume configured to accommodate packages and other cargo. The side walls 52 and the forward partition 100 extend upwardly from the lower wall 56 in substantially perpendicular orientation with respect to the lower wall 56. As shown in FIGS. 1-2, the forward partition 100 is disposed proximate to the cab 40 and separates occupants in the cab 40 from the storage volume (e.g., separates an interior volume of the cab 40 from the storage volume). As shown in FIG. 7, the cargo box 50 includes multiple access points that may be used by an occupant to access the storage volume. A first access, shown as access 110 is a rectangular cutout disposed centrally in the forward partition 100. A second access, shown as side access 200 is a rectangular cutout disposed in a side wall 52 of the cargo box 50. In an illustrative embodiment, the side access 200 is disposed just forward of a set of rear wheel wells 62 in the cargo box 50. A third and final access, shown as rear access 300 is a rectangular cutout disposed in a rear facing side wall 52 of the cargo box 50. As shown in FIG. 7, the rear access 300 provides an occupant with greater clearance for accessing the storage volume as compared with access 110 or side access 200.

Figure 8:
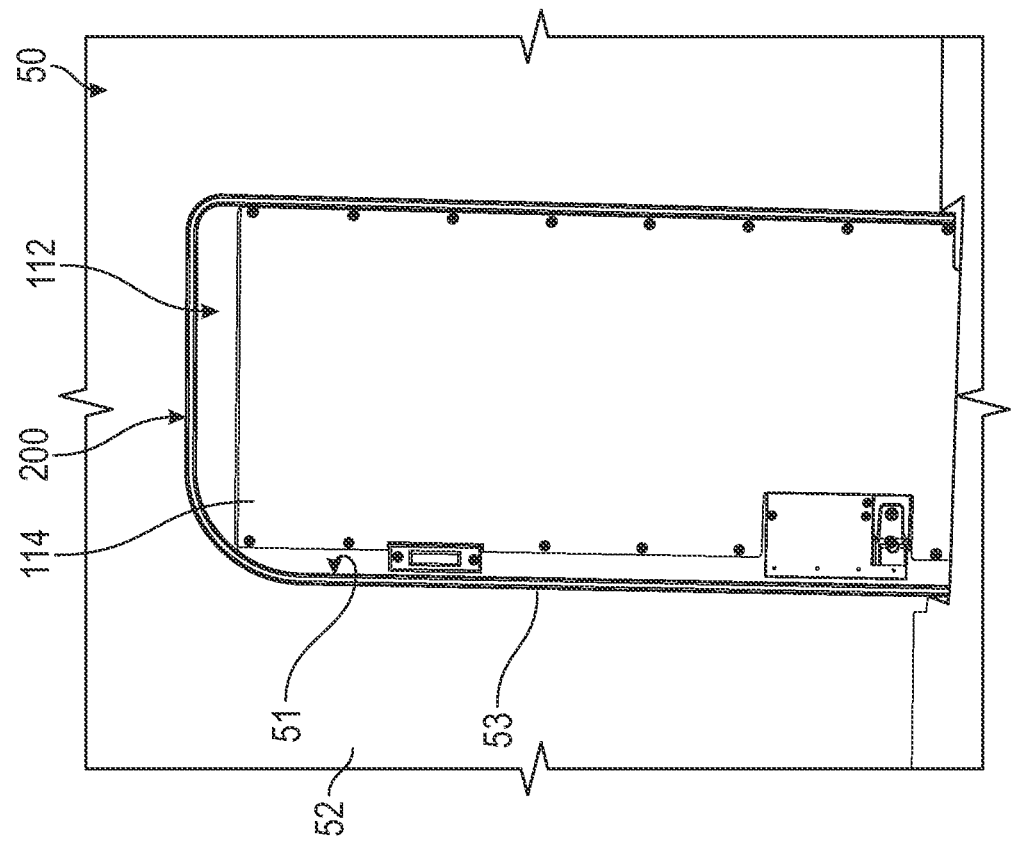
FIG. 8 is a left side view of the mail and package delivery vehicle of FIGS. 1-2, at a cross-section parallel to a longitudinal axis of the vehicle.
Figure 11:
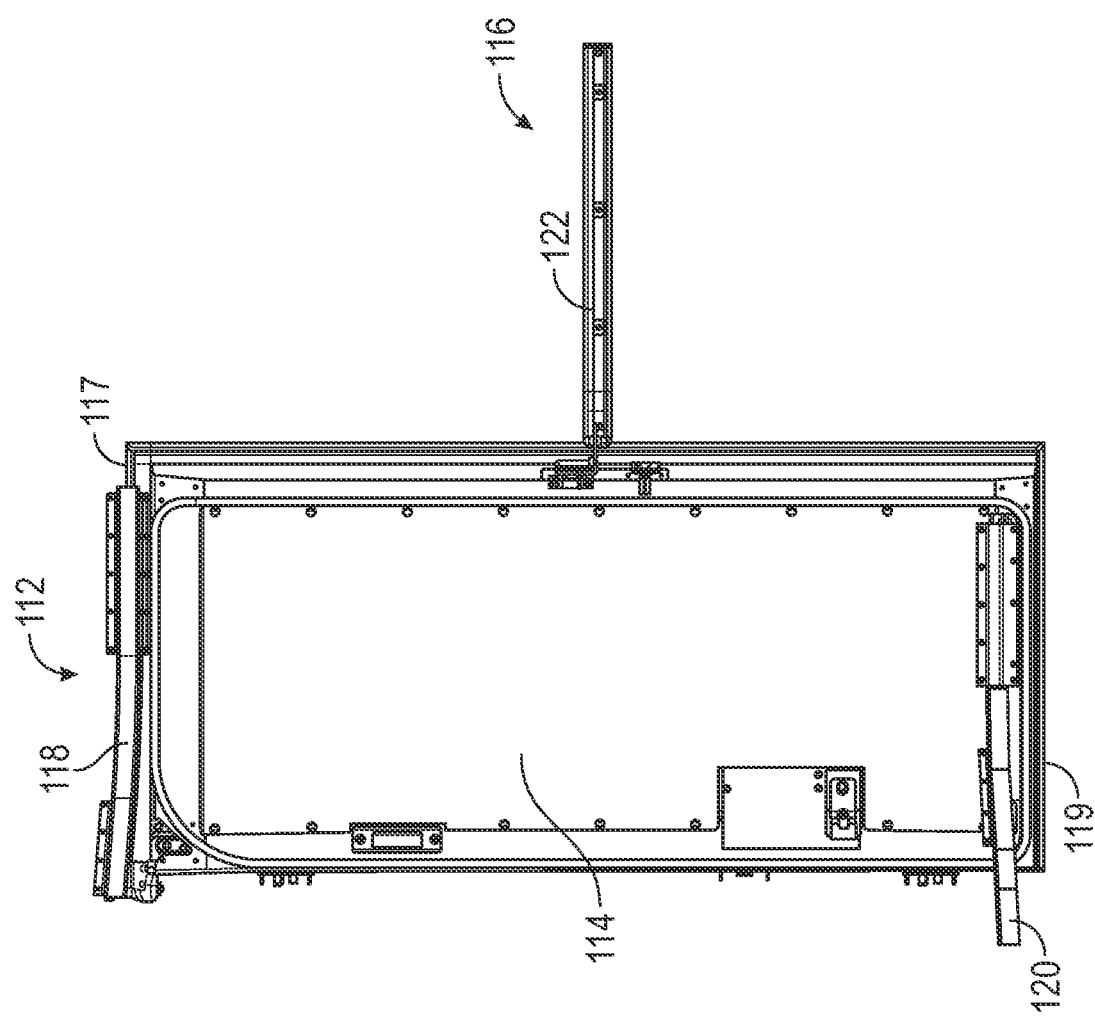
FIGS. 10-11 are perspective views of a side access door for a mail and package delivery vehicle, according to an illustrative embodiment.
Figure 10:
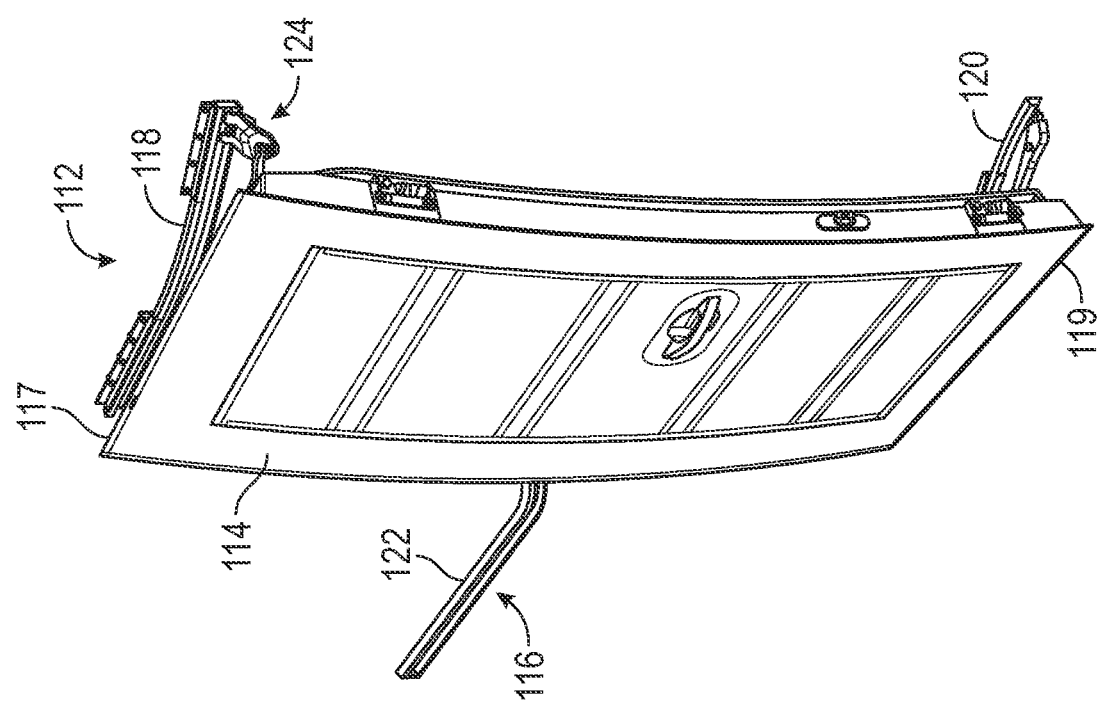

As shown in FIG. 8, a side access door assembly 112 is disposed in side access 200 and prevents unwanted entry through the side access 200. As shown in FIG. 3, the side access door assembly 112 is spaced apart from (e.g., separated from) the sliding front door system 64 in a longitudinal direction (e.g., front to back of the delivery vehicle 10) to accommodate the track assemblies for the sliding front door system 64. As shown in FIGS. 10-11, the side access door assembly 112 includes a rectangular side door 114 and a track assembly, shown as side track assembly 116 that is coupled to the side door 114. The rectangular side door 114 is slidably engaged to the cargo box 50 via the side track assembly 116. Among other benefits, using sliding doors on both the cab 40 and the cargo box 50 (see FIG. 3), such that there is two sliding doors on the same side of the delivery vehicle 10, improves accessibility in tight spaces and reduces the overall footprint of the delivery vehicle 10 when the sliding doors are open (e.g., relative to hinged-type doors).

Figure 9:
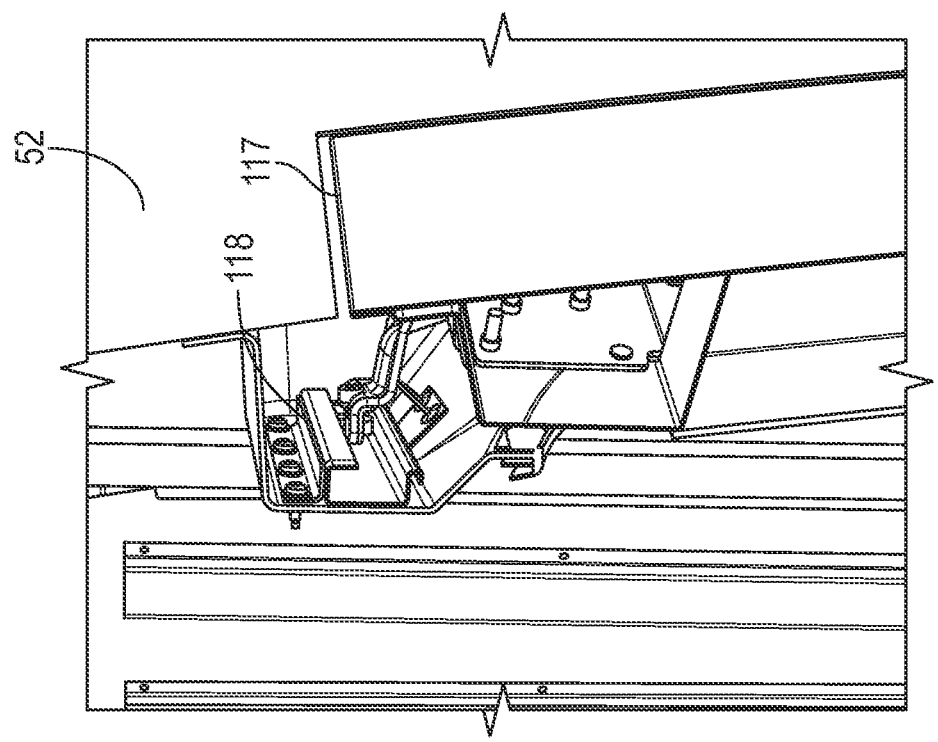
FIG. 9 is a perspective view of a track assembly for a side access door of the mail and package delivery vehicle of FIGS. 1-2.

The side track assembly 116 includes an upper track member 118 slidably coupled to the side door 114 proximate to an upper edge 117 of the rectangular side door 114. As shown in FIG. 9, the upper track member 118 is rigidly coupled to (e.g., rigidly mounted to, secured in position relative to) a surface of a first internal cavity of the side wall 52 that is proximate to the upper wall 54. As shown in FIGS. 10-11, the side track assembly 116 additionally includes a lower track member 120 slidably coupled to a lower edge 119 of the side door 114 and a central track member 122 slidably coupled to the side door 114 at a central position between the upper edge 117 and the lower edge 119. Similar to the mounting configuration for the upper track member 118 shown in FIG. 9, the lower track member 120 is rigidly coupled to a surface of a second internal cavity of the side wall 52 proximate the lower wall 56 of the cab 40. As shown in FIGS. 1 and 3, the central track member 122 is rigidly coupled to the side wall 52 of the cab 40 in a central position between the upper track member 118 and the lower track members 120.

Each of the upper track member 118, the lower track member 120, and the central track member 122 is arranged to extend in a substantially longitudinal direction (e.g., front-to-back of the delivery vehicle 10) to facilitate movement of the side door 114 between a closed position, where the side door 114 fully occludes the side access 200 (as shown in FIG. 3), and an open position, where at least a portion of the side door 114 is positioned at least partially rearward of the side access 200. Each of the track members 118, 120, 122 is fastened to the cargo box 50 using a plurality of screws, bolts, rivets or any other suitable fastener. In other embodiments, at least one of the track members 118, 120, 122 is directly welded to the side wall 52 of the cargo box 50. In the delivery vehicle 10 of FIGS. 1-6, each of the track members 118, 120, 122 is fastened to the cargo box 50 using a series of bolts 208 that interface with a corresponding one of a plurality of through-holes disposed centrally along the length of each of the track members 118, 120, 122.

As shown in FIG. 8, the side door 114 is configured to be inserted (e.g., nested within) a recessed area 51 in the side wall 52 of the cargo box 50. Among other benefits, this nested configuration reduces aerodynamic drag on the cab 40 while the delivery vehicle 10 is in motion and improves sealing between the side door 114 and the side access 200. The recessed area 51 includes a sealing wall 53 (e.g., lip, flange, etc.) extending inwardly along a perimeter of the side access 200. As shown in FIG. 8, the sealing wall 53 is located proximate to an interior surface of the side door 114 when the side door 114 is in the closed position. In an exemplary embodiment, a gasket or other compliant material is disposed along a sealing surface of the sealing wall 53, between the sealing wall 53 and the interior surface of the side door 114 to prevent particulate and water ingestion into the cargo box 50. Other surfaces of the recessed area 53 may also be considered as sealing surfaces in that each faces a corresponding one of the interior surfaces of the sliding door, which prevents particulate and water ingestion into the cab 40.

As shown in FIGS. 10-11, a first end of each of the track members 118, 120, 122 is curved inwardly (e.g., toward the storage volume of the cargo box 50 of FIGS. 1-2). This configuration allows the side door 114 to move at least partially laterally inward toward the storage volume along the curved portion of each of the track members 118, 120, 122 such that, in the closed position, an outer surface of the side door 114 is approximately coplanar with an exterior surface of the side wall 52 (see FIG. 5). As shown in FIGS. 10-11, the side door 114 is slidably coupled to each of the track members 118, 120, 122 via connective sub-assemblies. A connective sub-assembly 124 for the upper track member 118 is shown in FIG. 10. The connective sub-assembly 124 is configured to maintain the side door 114 in parallel alignment with the side wall 52 of the delivery vehicle 10 (e.g., to prevent the side door 114 from contacting the side wall 52) when the side door 114 is reconfigured from the closed position to the open position (see also FIG. 1). The connective sub-assembly 124 includes a roller assembly having wheels or rollers that interface with one or more surfaces of a corresponding track member 118, 120, 122. The roller assembly is pivotably coupled to (such that it may at least partially rotate and/or pivot relative to) a first end of an adapter that extends between the roller assembly and an interior surface of the side door 114. The second end of the adapter is rigidly coupled to the interior surface of the side door 114. In an embodiment, the adapter may be fastened to the interior surface of the side door 114 using bolts, screws, or any other suitable fastener. In other embodiments, the adapter may be welded to the interior surface of the side door 114.

Returning to FIG. 6, the cargo box 50 includes a rear door 302 that is slidably engaged to a rear facing side wall 52 of the cargo box 50. In various embodiments, the rear door 302 is a roll-up or coiling door that is configured to retract toward the upper wall 54 of the cargo box 50. In other embodiments, the rear door 302 is configured as a sectional door (e.g., a garage-style door including multiple hingedly connected sections) that slides along two substantially parallel guide rails coupled to the cargo box 50. In yet other embodiments, the rear door 302 is a canopy door.

Figure 4:
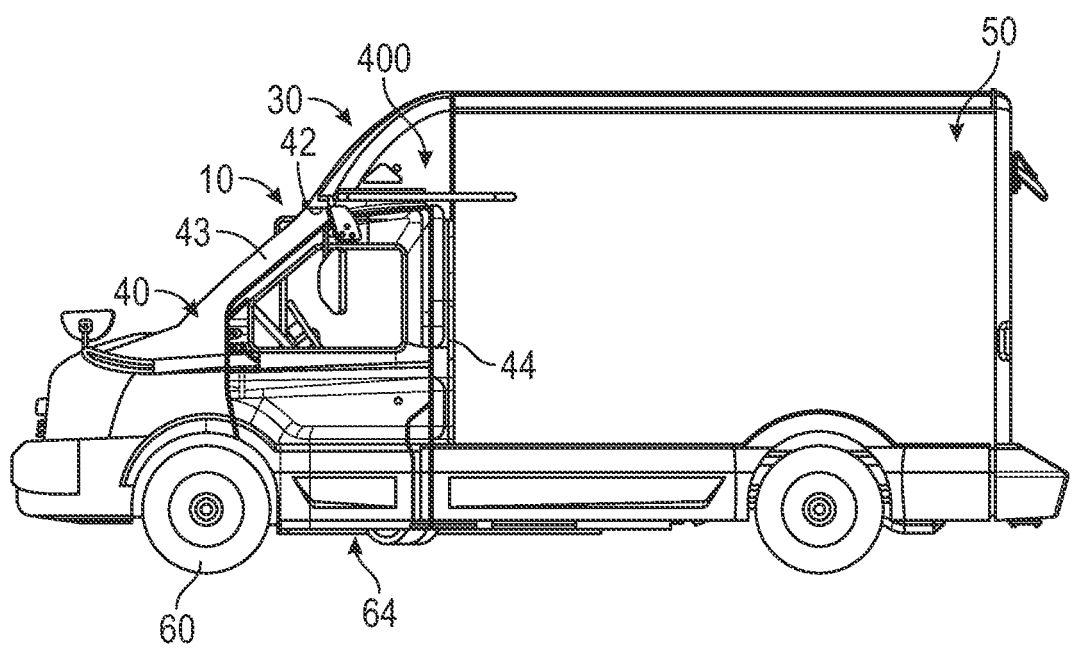
FIG. 4 is a left side view of the mail and package delivery vehicle of FIGS. 1-2.
Figure 5:
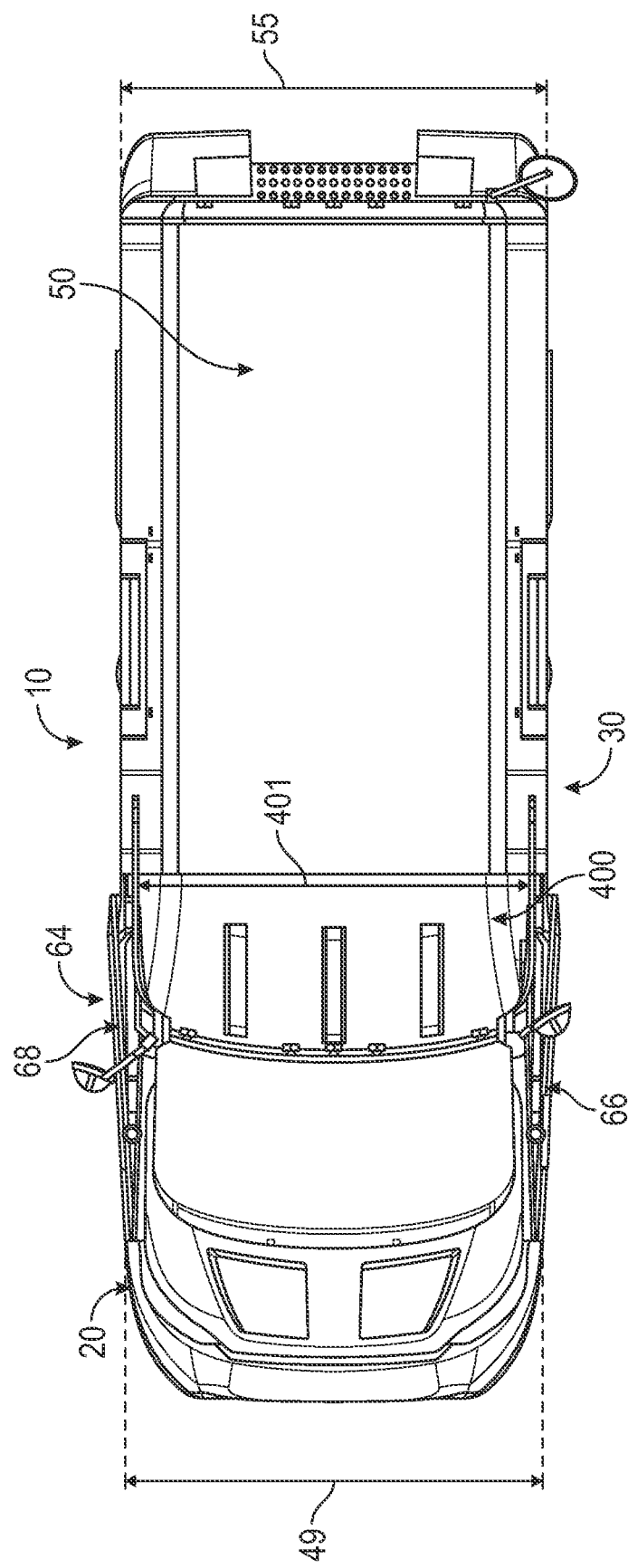
FIG. 5 is a top view of the mail and package delivery vehicle of FIGS. 1-2.

In the exemplary embodiment of FIGS. 1-6, the delivery vehicle 10 includes a roof cap assembly, shown as roof cap 400, disposed on an upper surface 42 of the cab 40. As shown in FIGS. 1-6, the roof cap 400 is rigidly coupled to both the upper surface 42 of the cab 40 and the forward partition 100 (e.g., a forward surface of the cargo box 50) using a series of fasteners (e.g., bolts, screws, etc.). In other embodiments, the roof cap 400 may be welded to at least one of the upper surface 42 of the cab 40 and the forward partition 100. As shown in FIGS. 3-4, once installed, the roof cap 400 extends between an A-pillar 43 of the cab 40 (e.g., a support pillar forward of the cab 40 toward the front windshield) and a B-pillar 44 of the cab 40 (e.g., a vertically oriented support pillar toward the rear of the cab 40). As shown in FIG. 5, a width 401 of the roof cap 400 in a lateral direction (e.g., between the driver side and the passenger side of the delivery vehicle 10) is approximately equal to a width 49 of the cab 40 and a width 55 of the cargo box 50 in order to reduce drag on the delivery vehicle 10 during operation.

Figure 12:
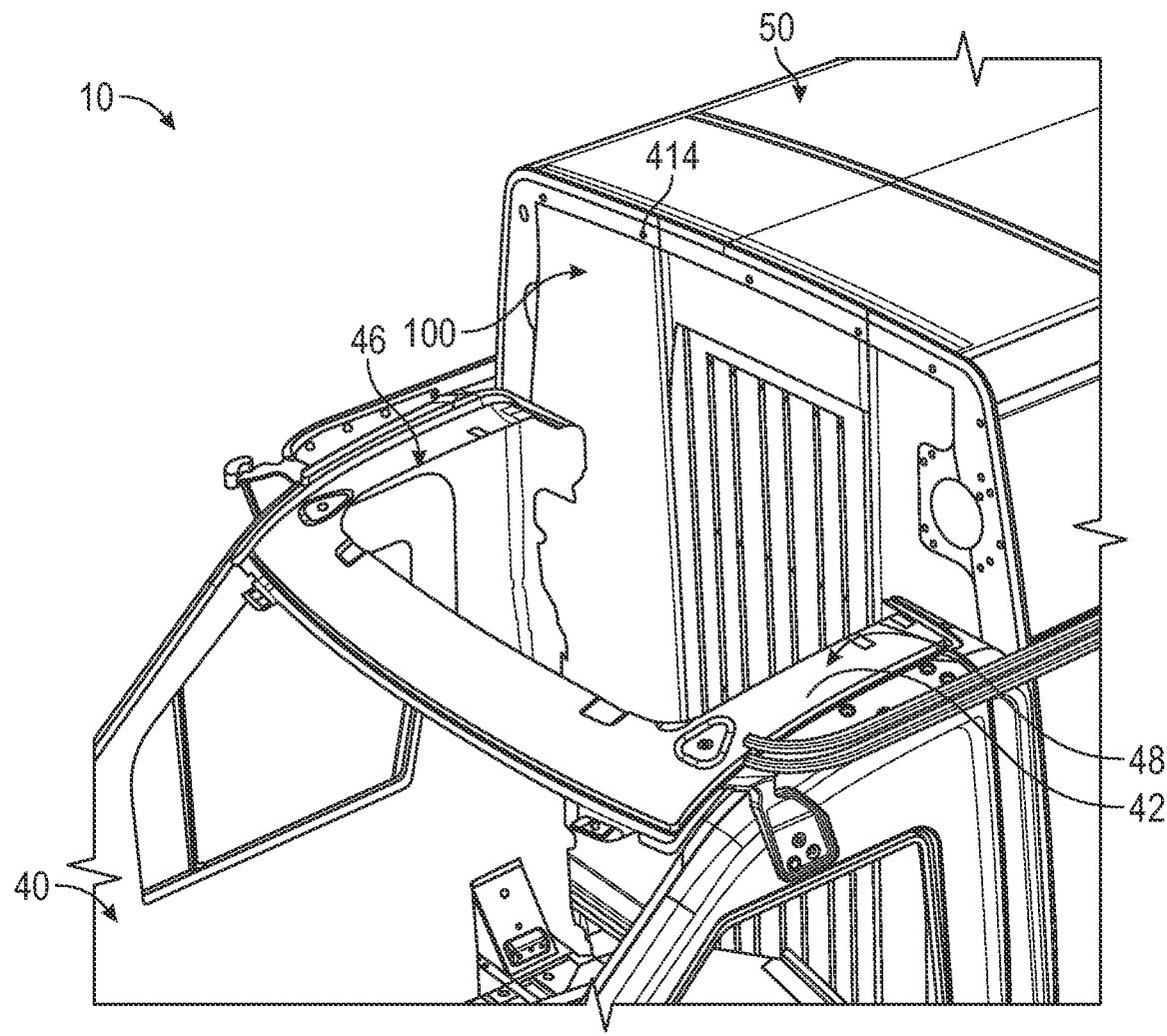
FIG. 12 is a perspective view of the mail and package delivery vehicle of FIGS. 1-2 shown without a roof cap assembly.
Figure 13:
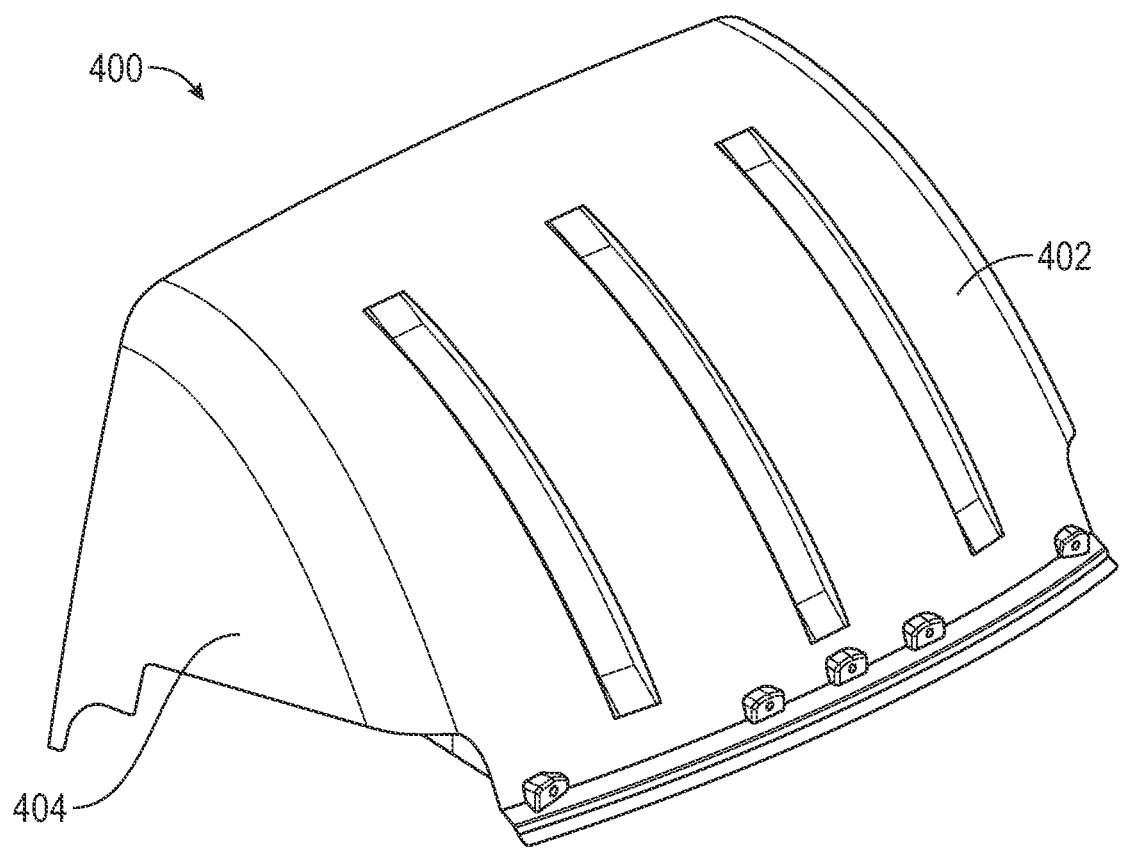
FIGS. 13-14 are perspective views of a roof cap assembly for a mail and package delivery vehicle, according to an illustrative embodiment.
Figure 14:
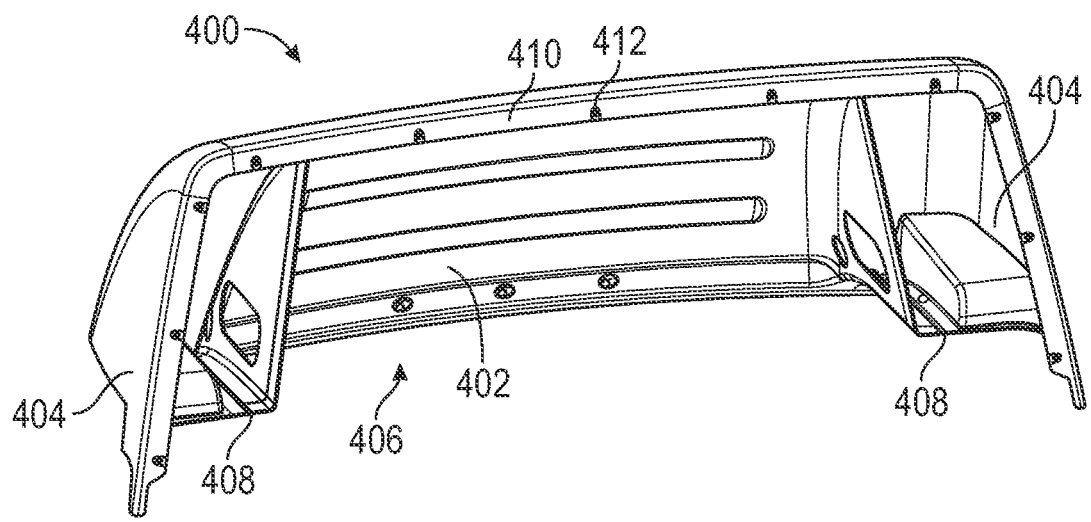
Figure 15:
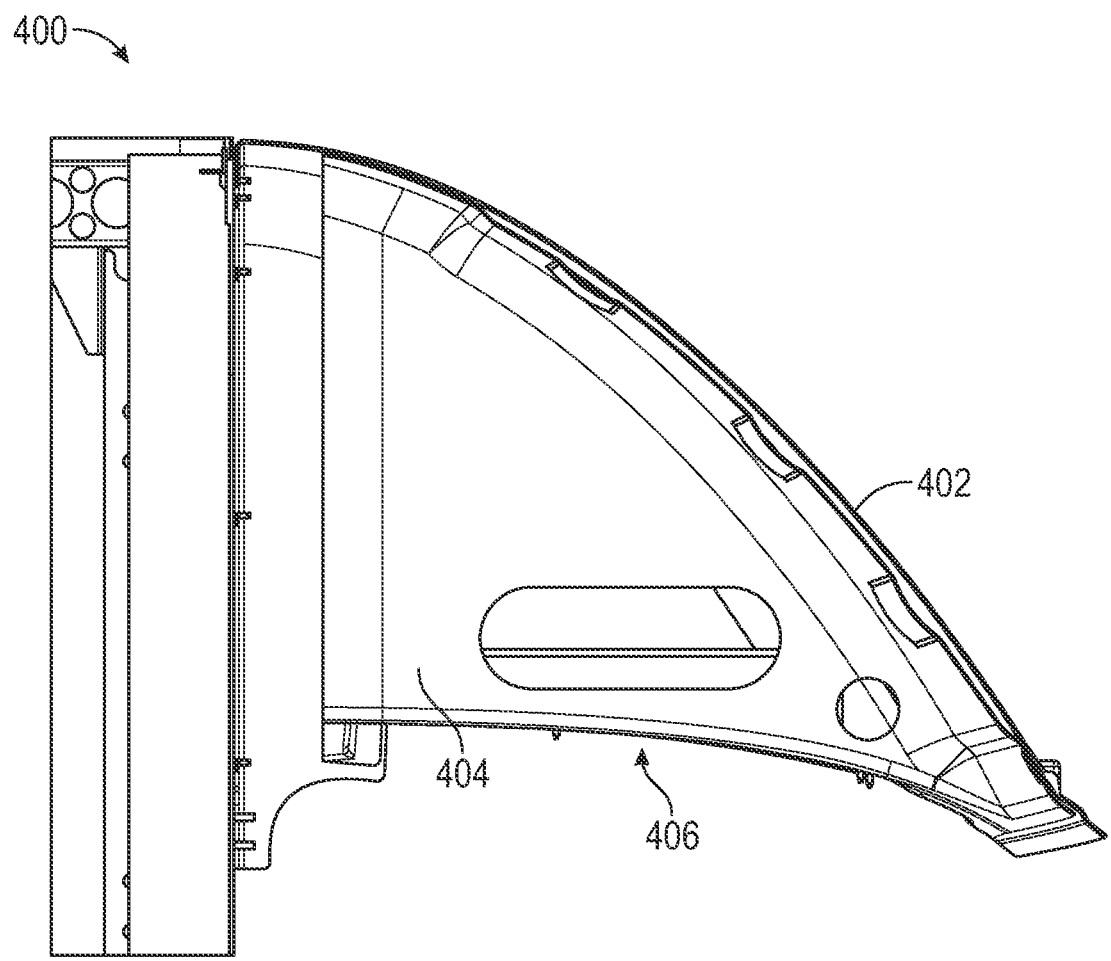
FIG. 15 is a side view of the roof cap assembly of FIGS. 13-14.

Referring now to FIG. 12, the roof cap 400 (not shown) is configured to completely cover (e.g., enclose) a cutout 46 disposed in a top wall 48 of the cab 40. Among other benefits, the cutout 46 provides vertical clearance to an occupant who may be required to access the storage volume of the cargo box 50 through partition access 110. Advantageously, the roof cap 400 accommodates the transition in height between the cab 40 and the cargo box 50. Various designs are contemplated for the roof cap 400. In the exemplary embodiment of FIGS. 13-15, the roof cap 400 is formed from one or more pieces of lightweight material (e.g., injection molded plastic, aluminum, etc.). The roof cap 400 includes a forward wall 402 and lateral walls 404 that are substantially perpendicular to the forward wall 402 that, together, define an enclosed interior space 406. As shown in FIGS. 13-15, the forward walls 402 of the roof cap 400 and the transition between the forward walls 402 and the lateral walls 404 are curved to reduce aerodynamic drag on the delivery vehicle 10 during operation. As shown in FIG. 14, the roof cap 400 may further include one or more support members 408, which interface with the upper surface 42 of the cab 40.

As shown in FIG. 14, the roof cap 400 includes a mating interface, shown as lip 410 that extends along a perimeter of a rear portion of the roof cap 400. A series of mounting holes 412 are disposed in the lip 410. Each of the mounting holes 412 is alignable with a corresponding one of a plurality of receiving holes 414 (FIG. 12) in the forward partition 100. In other embodiments, the lip 410 may extend at least partially along a perimeter of a lower portion of the roof cap 400 or a perimeter of both the rear portion and the lower portion. The roof cap 400 is coupled to at least one of the top wall 48 (e.g., upper surface 42) or the forward partition 100 (e.g., one or both of the top wall 48 and forward partition 100) using a series of bolts, screws, rivets, or another suitable fastener, each of which pass through one of the mounting holes 412 and corresponding one of the receiving holes 414. As shown in FIGS. 1-2, an upper edge 403 of the roof cap 400 is approximately flush with the upper wall 54 such that the roof cap 400 is approximately co-planar with the upper wall 54 proximate to the upper edge 403. As shown in FIG. 15, at least one surface of the roof cap 400 is contoured to match the shape of the upper surface 42 of the cab 40, which, advantageously, reduces the size of the gap between the roof cap 400 and the upper surface 42. In an embodiment, the roof cap 400 may further include a gasket or other sealing material (e.g., disposed along the lip 410) to improve sealing between the cab 40 and the surrounding environment.

Figure 17:
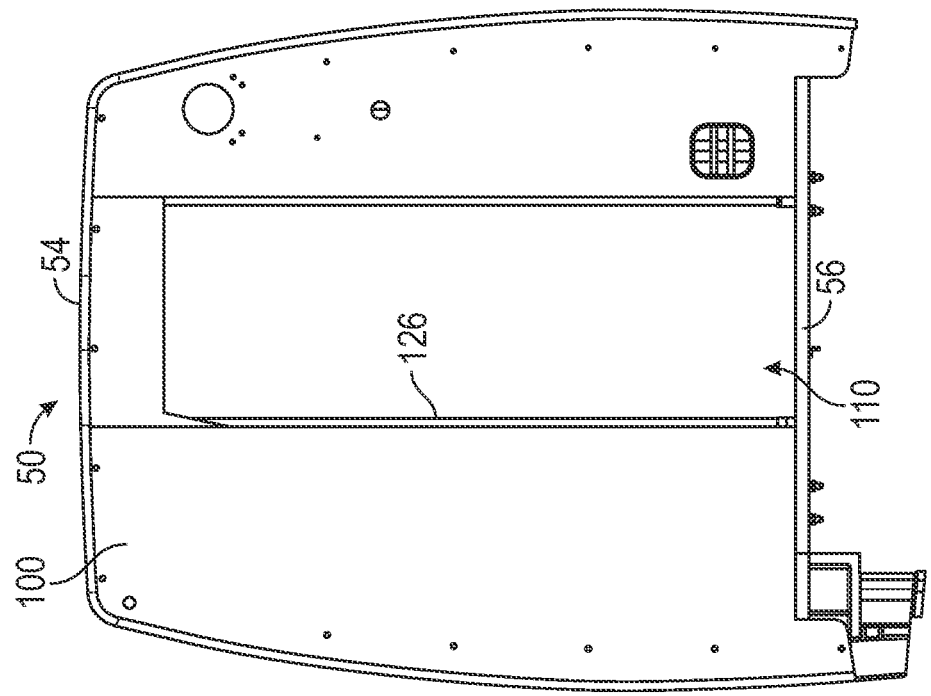
FIGS. 16-17 are rear and front views, respectively, of a cargo box of a mail and package delivery vehicle, according to an illustrative embodiment.
Figure 16:
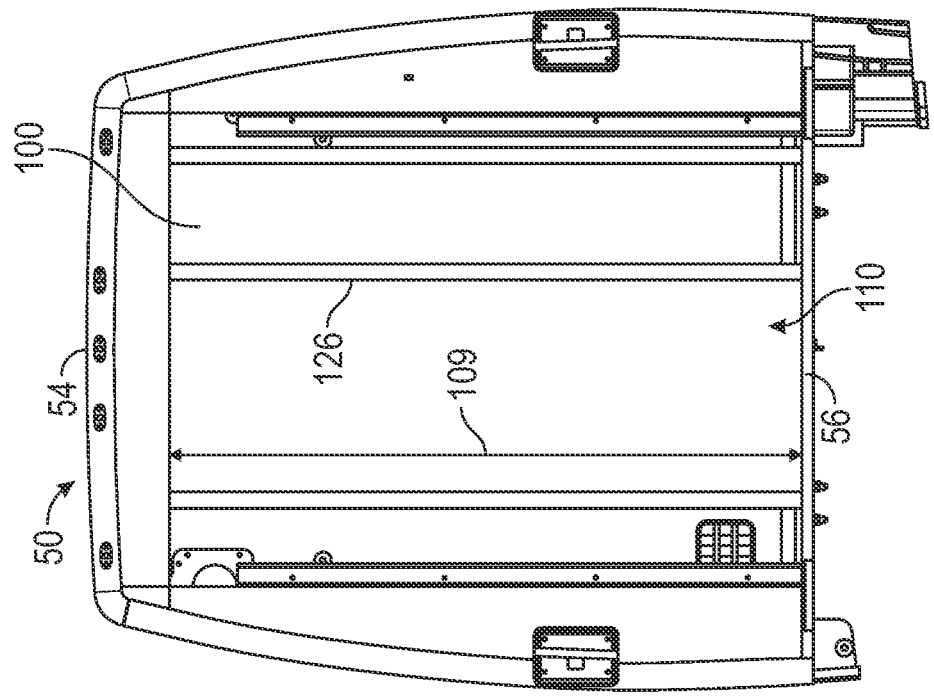

Referring now to FIGS. 16-17, the cargo box 50 includes a forward partition 100 proximate to a rear wall of the cab 40 (see FIG. 2). The forward partition 100 separates an occupant of the delivery vehicle 10 (e.g., an interior of the cab 40) from the storage volume (e.g., the interior of the cargo box 50). In the event of a traffic accident or collision, the forward partition 100 prevents any loose cargo from escaping the cargo box 50 and injuring the occupant. In an exemplary embodiment, a first portion of the forward partition 100 is made from perforated sheet steel. In other embodiments, the first portion of the forward partition 100 may be made from solid sheet steel, aluminum, or various other materials. The sheet steel is coupled (e.g., welded, fastened, etc.) to a plurality of substantially vertical frame members, shown as frame members 126 that extend between the lower wall 56 and upper wall 54 of the cargo box 50. In addition to supporting the forward partition 100, the vertical frame members 126 may also support the cab 40, which may be bolted, riveted or otherwise fastened to at least one of the forward partition 100 and vertical frame members 126.

Figure 18:
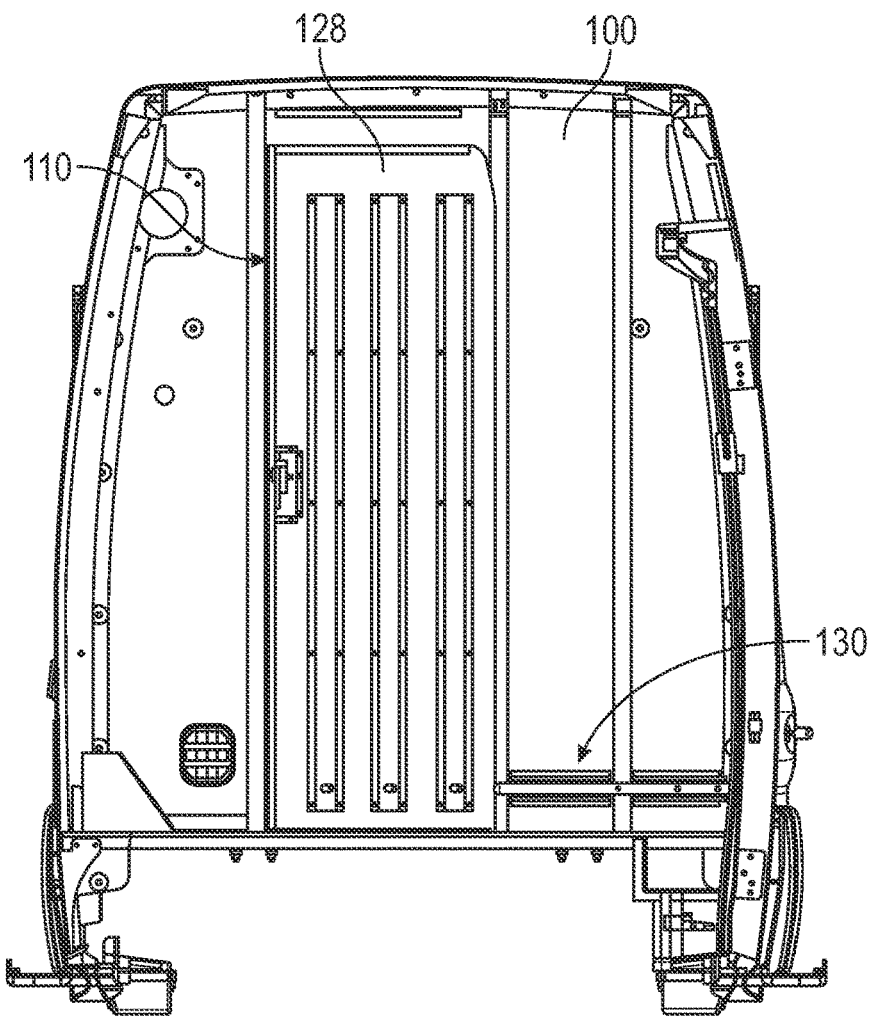
FIG. 18 is a rear view of the cargo box of FIGS. 16-17 with the partition door installed.
Figure 19:
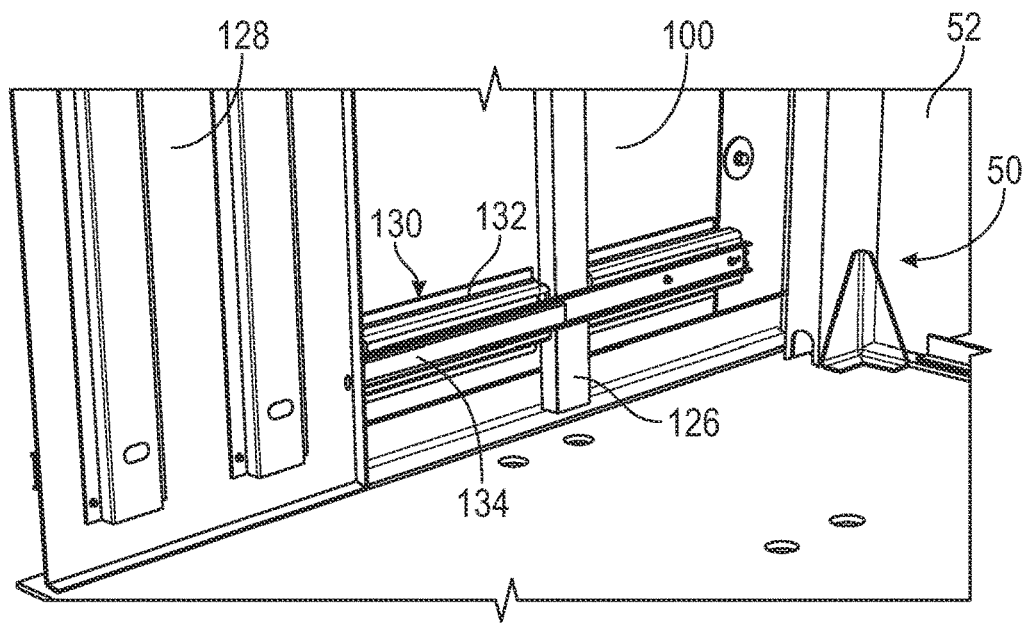
FIG. 19 is a perspective view of a track assembly for the partition door of FIG. 18.

As shown in FIGS. 16-17, the occupant may access the storage volume via access 110, which is a rectangular shaped cutout centrally disposed in the forward partition 100. The access 110 is sized to accommodate a standing height (e.g., full vertical height) of an occupant of the delivery vehicle 10. In other words, a height 109 of the access 110 is greater than a maximum height of the cab 40 (e.g., an interior volume of the cab 40). As shown in FIGS. 18-19, an access door 128 is disposed in access 110 of the forward partition 100. The access door 128 is slidably engaged to the forward partition 100 by track assembly 130. As shown in FIG. 19, the track assembly 130 for the access door 128 includes at least one guide rail, shown as rail 132 that is rigidly coupled to at least one of the forward partition 100 and one or more vertical frame members 126. The track assembly 130 additionally includes a mating rail, shown as door rail 134 that is rigidly coupled to the access door 128 (e.g., using bolts, screws, a weld joint, etc.). As shown in FIG. 19, the door rail 134 is received within the rail 132 and slides along the rail 132 toward the side wall 52 of the cargo box 50 (e.g., in a lateral direction, in a direction that is substantially normal to the side wall 52 of the cargo box 50). In an exemplary embodiment, the track assembly 130 is a telescoping slide rail. Alternatively, the track assembly 130 may include a connective sub-assembly similar to that used for the side access door assembly 112 of FIGS. 10-11 or another sliding mechanism that provides suitable structural support for the access door 128.

Figure 21:
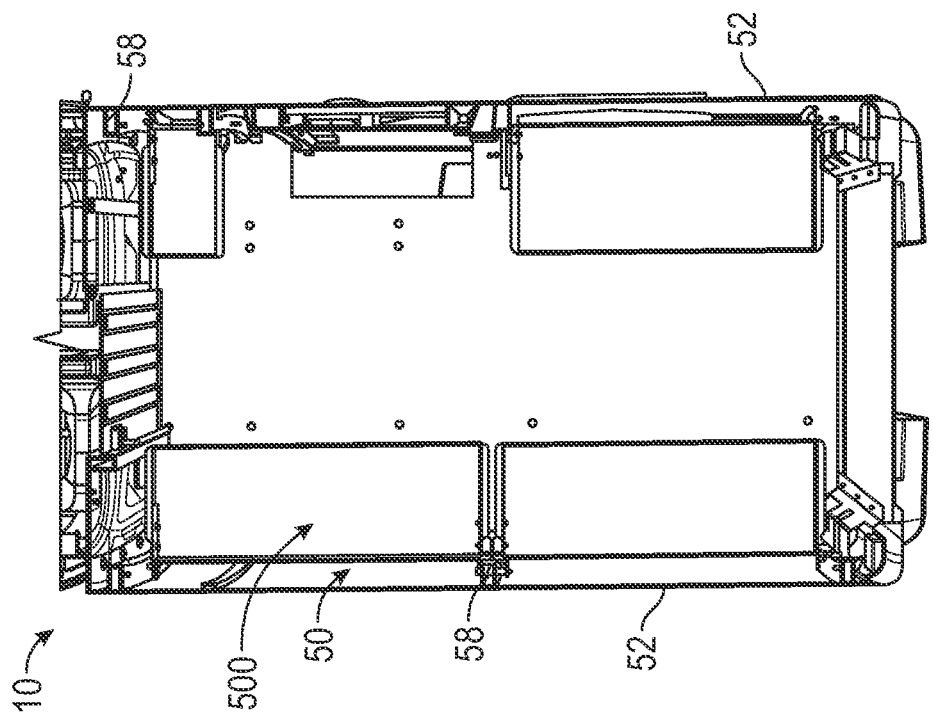
FIG. 21 is a top view of the cargo box of FIG. 20.
Figure 20:
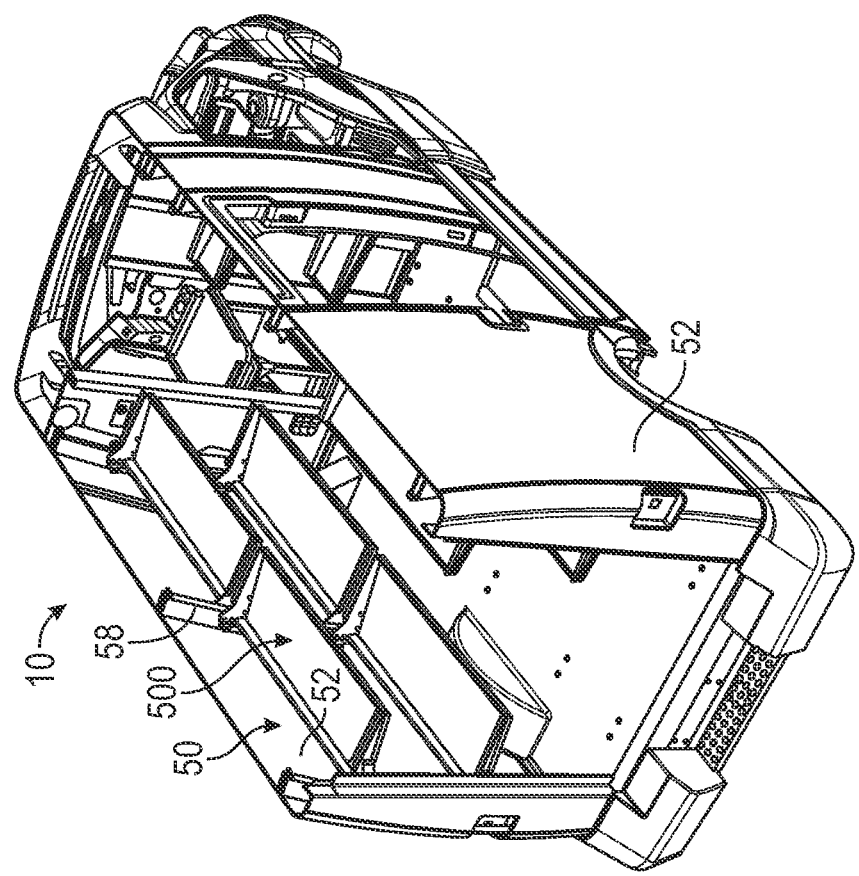
FIG. 20 is a perspective view of a fully assembled cargo box for a mail and package delivery vehicle, shown with an upper wall of the cargo box removed, according to an illustrative embodiment.

As shown in FIGS. 20-21, the cargo box 50 further includes a frame including a plurality of cargo frame members, shown as frame members 58 disposed at regular intervals along the length (e.g., forward-to-backward) of the cargo box 50. Each of the frame members 58 is disposed proximate to a side wall 52 of the cargo box 50 and is oriented in a direction that is substantially normal to a lower wall of the cargo box 50 (e.g., the cargo frame members extend upwardly from the lower wall). The frame members 58 are configured to reinforce the cargo box 50 and provide a mounting location for a plurality of shelves 500.

Figure 22:
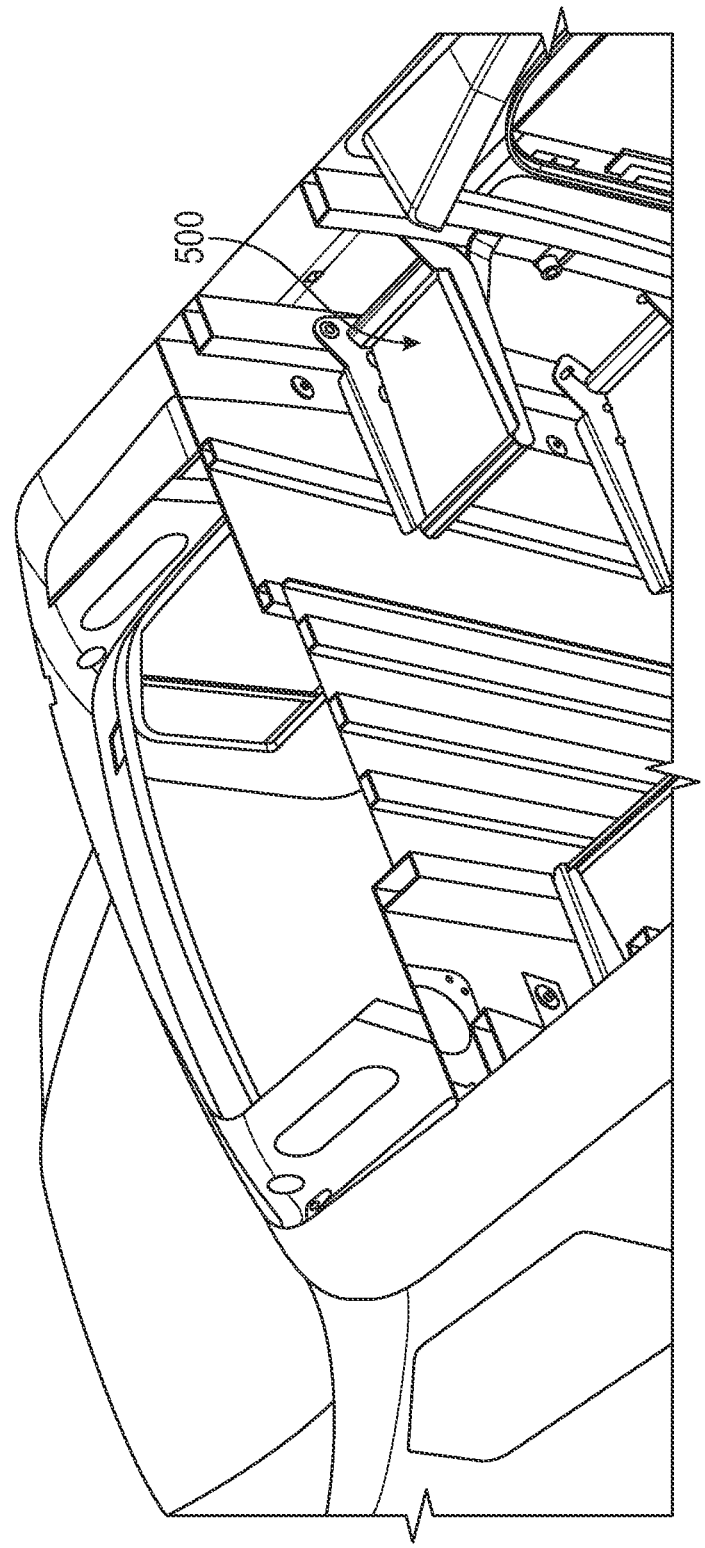
FIG. 22 is a top perspective cross-sectional view of the cargo box of FIG. 20
Figure 23:
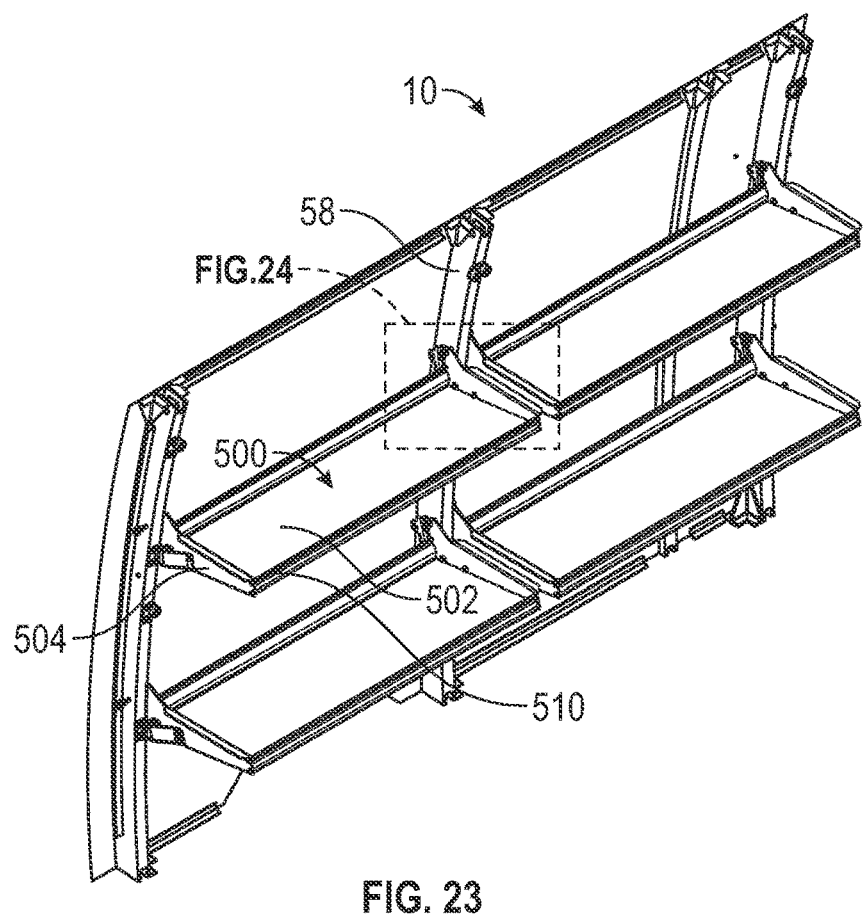
FIG. 23 is a perspective view of a shelf arrangement for the cargo box of FIG. 20.

A plurality of shelves 500 is disposed in the storage volume of the cargo box 50 as shown in FIG. 21. The shelves 500 are configured to accommodate packages and other cargo in the storage volume. As shown in FIGS. 21-22, shelves 500 of various different sizes and shapes may be utilized. As shown in FIG. 23, each of the shelves 500 includes a base wall 502 and two mounting legs 504. Each of the mounting legs 504 is coupled to the base wall 502 proximate to an end of the base wall 502. Each of the mounting legs 504 is oriented in a direction that is substantially perpendicular to the base wall 502. Each of the shelves 500 may further include one or more retaining elements, shown as retaining lips 510 that prevent packages and cargo from sliding off of the shelves 500 while the delivery vehicle 10 is in transit.

Figure 24:
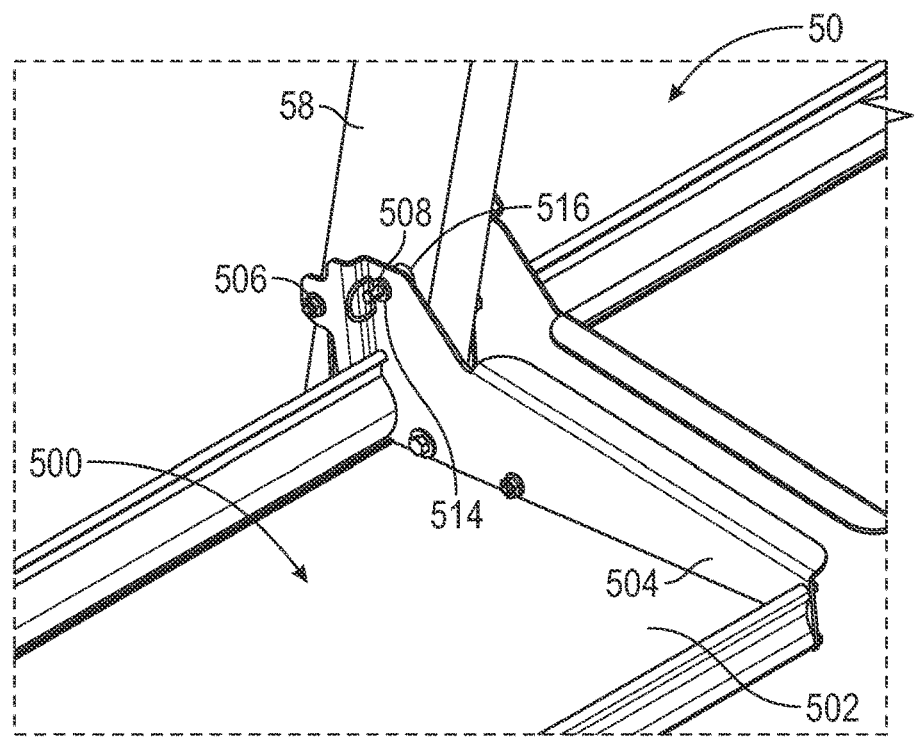
FIG. 24 is an enlarged perspective view of a coupling mechanism for the shelf arrangement of FIG. 23.
Figure 25:
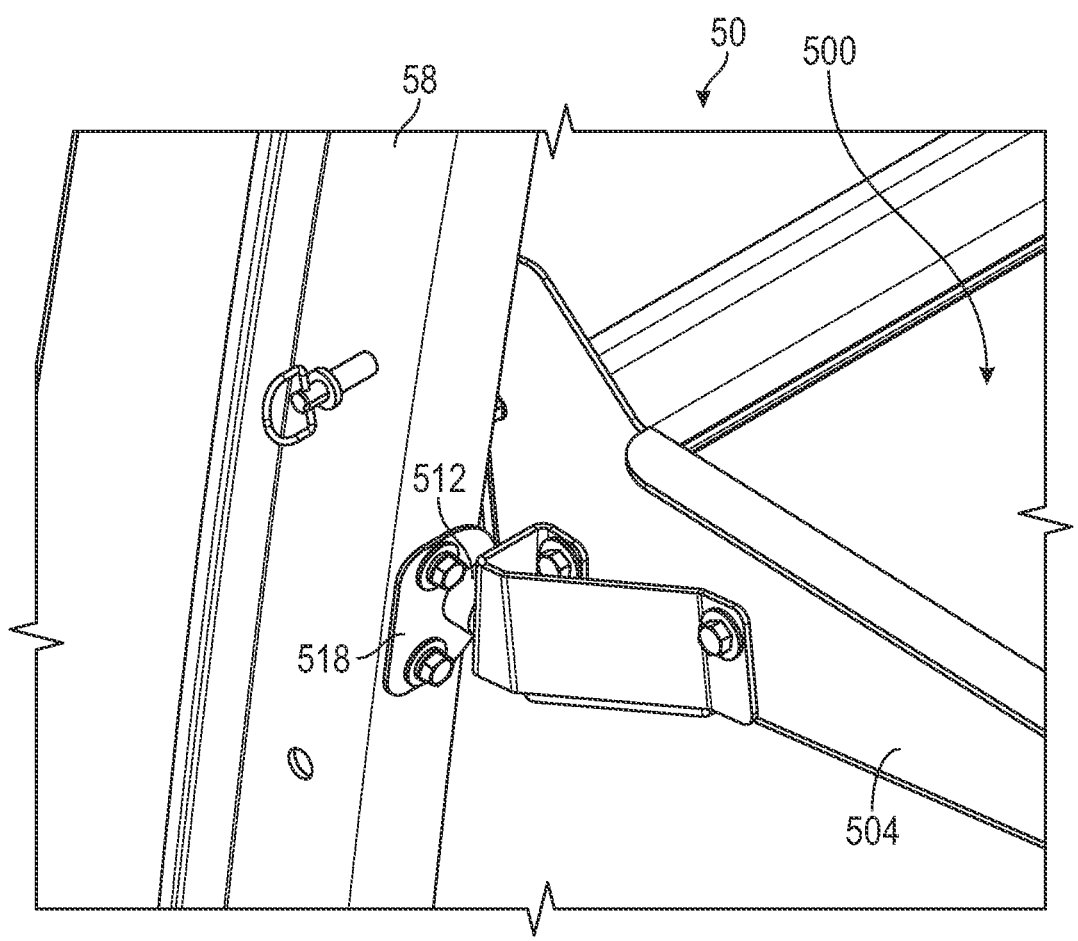
FIG. 25 is an enlarged perspective view of a leveling bumper mechanism for the shelf arrangement of FIG. 23.

As shown in FIG. 23, each of the shelves 500 is disposed between two adjacent frame members 58 in the cargo box 50. As shown in FIG. 24, each of the shelves 500 is pivotably coupled to the frame members 58 using a bolt 506, or another suitable fastener. Each of the shelves 500 is configured to rotate toward an upper wall of the cargo box 50 (e.g., a roof of the cargo box 50). An angular position of each of the shelves 500 may be secured using a locating member (e.g., a pin, bolt, etc.), shown as pin 508. As shown in FIG. 24, the pin 508 engages with a through hole 514 in one of the mounting legs 504 and a corresponding through hole 516 in one of the frame members 58. In some embodiments, the frame members 58 may each include multiple through holes 516 to secure the base wall 502 at different angular positions relative to one of the side walls of the cargo box 50. As shown in FIG. 25, a contact element, shown as contact pad 512 is rigidly coupled to at least one mounting leg 504 of each of the shelves 500 and may be used to set a nominal angular position of the shelves 500 for storing various items (e.g., a position that prevents any packages or cargo from dropping from the shelves 500, a position of the shelves 500 under vertical loading). As shown in FIG. 25, the contact pad 512 is engaged with one of the frame members 58. Specifically, the contact pad 512 contacts a stop plate 518 that is rigidly coupled to the frame member 58 (e.g., via bolts or another suitable fastener). In some embodiments, the position of the stop plate 518 may be adjustable to support the base wall 502 at different angular positions relative to the side wall of the cargo box 50. Among other benefits, using adjustable shelving 500 increases the utility of the cargo box 50, which may be adapted to suit a variety of different storage configurations.

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A vehicle, comprising:
a chassis; and
a vehicle body coupled to the chassis, the vehicle body comprising:
  a cab disposed on a forward end of the chassis; and
  a cargo body disposed on a rear end of the chassis, the cargo body including:
    a forward partition that engages the cab, the forward partition defining an opening, a height of the opening being greater than a height of the cab; and
    an access door disposed in the opening, and slidably engaged to the forward partition.

2. The vehicle of claim 1, wherein the height of the opening is sized to accommodate a standing height of an occupant of the vehicle.

3. The vehicle of claim 1, wherein the cargo body further comprises:
a lower wall;
a plurality of frame members extending upwardly from the lower wall; and
a plurality of shelves pivotably coupled to the plurality of frame members.

4. The vehicle of claim 1, wherein the cargo body further includes:
a lower wall;
a plurality of frame members extending upwardly from the lower wall; and
a plurality of shelves pivotably coupled to the plurality of frame members, wherein each one of the plurality of shelves comprises a base wall and a locating member configured to set an angular position of the base wall relative to one of the plurality of frame members.

5. The vehicle of claim 1, further comprising:
a plurality of frame members coupled to the cargo body; and
a shelf pivotably coupled to at least one of the plurality of frame members and movable between a folded position in which the shelf is retracted toward a side wall of the cargo body and an extended position in which the shelf extends away from the side wall, the shelf disposed between adjacent ones of the plurality of frame members, wherein in the folded position the shelf is retracted into a space formed between adjacent ones of the plurality of frame members.

6. The vehicle of claim 5, wherein the shelf comprises a base wall and a locating member configured to set an angular position of the base wall relative to at least one of the plurality of frame members.

7. The vehicle of claim 1, wherein the vehicle body further comprises a roof cap assembly extending between an upper surface of the cab and a forward surface of the cargo body.

8. The vehicle of claim 7, wherein a width of the roof cap assembly is approximately equal to a width of the cab, and wherein the width of the cab is approximately equal to a width of the cargo body.

9. The vehicle of claim 1, wherein the height of the cab is a distance between a floor of the cab and an upper end of a B-pillar of the cab.

10. The vehicle of claim 1, wherein the height of the opening is sized to accommodate a standing height of an occupant of the vehicle.

11. The vehicle of claim 1, further comprising:
a plurality of frame members disposed within the cargo body;
a shelf pivotably coupled to at least one of the plurality of frame members and movable between a folded position in which the shelf is retracted toward a side wall of the cargo body and an extended position in which the shelf extends away from the side wall, the shelf including:
  a base wall and a locating member configured to set an angular position of the base wall relative to at least one of the plurality of frame members; and
  a mounting leg coupled to the base wall and oriented substantially perpendicular to the base wall, wherein the locating member engages the mounting leg.

* * * * *